US008028160B1

(12) United States Patent
Orr

(10) Patent No.: US 8,028,160 B1
(45) Date of Patent: Sep. 27, 2011

(54) DATA LINK LAYER SWITCH WITH PROTECTION AGAINST INTERNET PROTOCOL SPOOFING ATTACKS

(75) Inventor: Michael Orr, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1092 days.

(21) Appl. No.: 11/170,904

(22) Filed: Jun. 29, 2005

Related U.S. Application Data

(60) Provisional application No. 60/685,524, filed on May 27, 2005.

(51) Int. Cl.
H04L 29/06 (2006.01)
G06F 11/00 (2006.01)

(52) U.S. Cl. ............ 713/151; 713/150; 726/22; 726/23; 726/24; 709/224; 709/225

(58) Field of Classification Search .................. 713/151, 713/150; 726/22, 23, 24; 709/224, 225
See application file for complete search history.

(56) References Cited

U.S. PATENT DOCUMENTS

| | | | | |
|---|---|---|---|---|
| 7,234,163 B1* | 6/2007 | Rayes et al. | ...................... | 726/22 |
| 7,254,114 B1* | 8/2007 | Turner et al. | ................... | 370/244 |
| 7,331,061 B1* | 2/2008 | Ramsey et al. | .................. | 726/23 |
| 7,490,235 B2* | 2/2009 | Khosmood et al. | ........... | 713/154 |
| 7,512,980 B2* | 3/2009 | Copeland et al. | ................ | 726/23 |
| 7,646,770 B1* | 1/2010 | Parker | ............................ | 370/392 |
| 7,681,235 B2* | 3/2010 | Chesla et al. | .................... | 726/23 |
| 7,886,358 B2* | 2/2011 | Copeland, III | ................... | 726/23 |
| 2002/0069356 A1* | 6/2002 | Kim | ................................ | 713/160 |
| 2003/0200439 A1* | 10/2003 | Moskowitz | ................... | 713/176 |
| 2004/0003094 A1* | 1/2004 | See | ................................. | 709/227 |
| 2004/0093513 A1* | 5/2004 | Cantrell et al. | ............... | 713/201 |
| 2005/0213504 A1* | 9/2005 | Enomoto et al. | .............. | 370/235 |
| 2005/0262560 A1* | 11/2005 | Gassoway | ....................... | 726/22 |
| 2005/0276230 A1* | 12/2005 | Akahane et al. | ............. | 370/252 |
| 2006/0095968 A1* | 5/2006 | Portolani et al. | ................ | 726/23 |
| 2006/0123479 A1* | 6/2006 | Kumar et al. | ................... | 726/23 |
| 2006/0149965 A1* | 7/2006 | Sharma | .......................... | 713/163 |
| 2006/0242694 A1* | 10/2006 | Gold et al. | ...................... | 726/13 |
| 2007/0157306 A1* | 7/2007 | Elrod et al. | ...................... | 726/14 |
| 2008/0098476 A1* | 4/2008 | Syversen | ......................... | 726/23 |
| 2008/0196104 A1* | 8/2008 | Tuvell et al. | ...................... | 726/24 |
| 2008/0250496 A1* | 10/2008 | Namihira | ......................... | 726/22 |
| 2009/0028144 A1* | 1/2009 | Blair | ............................ | 370/389 |
| 2010/0103837 A1* | 4/2010 | Jungck et al. | ................. | 370/252 |

FOREIGN PATENT DOCUMENTS

WO   WO 2004025926 A1 *  3/2004

* cited by examiner

Primary Examiner — Nathan Flynn
Assistant Examiner — Sarah Su

(57) ABSTRACT

A data link layer switch having an associated method and computer program comprises a processor; a plurality of ports to exchange packets of data with a network; a memory to store a switch table; and a packet processor to transfer the packets of data between the ports according to the switch table, the packet processor comprising a classifier to send copies of selected ones of the packets of data to the processor; wherein the processor determines whether an attack upon the data link layer switch has occurred based on the copies of the selected ones of the packets.

49 Claims, 3 Drawing Sheets

DATA LINK LAYER SWITCH WITH PROTECTION AGAINST INTERNET PROTOCOL SPOOFING ATTACKS

BACKGROUND

The present invention relates generally to data communications. More particularly, the present invention relates to a data link layer switch with protection against Internet Protocol spoofing.

Secure data communications networks such as corporate intranets are the subject of increasingly numerous and sophisticated attacks from outside the network. One common component of such attacks, referred to as Internet Protocol (IP) spoofing, alters the IP source address of packets transmitted by the attacker. One purpose of IP spoofing is to conceal the identity of the attacker.

Another purpose of IP spoofing is to present the attacker as a user within the secure intranet under attack. Because devices within a secure intranet trust each other, an attacker masquerading as such a device can do more damage than an attacker that appears to be outside the network. For example, an attacker could transmit packets to a local-area network (LAN) using a altered or "spoofed" address of 192.168.1.200. Because this is the form of the internal IP addresses for many small LANs, the attacker may be accepted as a computer within the LAN.

SUMMARY

In general, in one aspect, the invention features a data link layer switch comprising: a processor; a plurality of ports to exchange packets of data with a network; a memory to store a switch table; and a packet processor to transfer the packets of data between the ports according to the switch table, the packet processor comprising a classifier to send copies of selected ones of the packets of data to the processor; wherein the processor determines whether an attack upon the data link layer switch has occurred based on the copies of the selected ones of the packets.

Some embodiments comprise an alarm unit to manifest an indication of the attack when the processor determines that the attack upon the data link layer switch has occurred. Some embodiments comprise a blocking unit to block the packets of data that are related to an attack when the processor determines that the attack upon the data link layer switch has occurred. In some embodiments, the classifier identifies the selected ones of the packets of data according to at least one of the group consisting of: contents of the packets of data; sampling criteria describing the packets of data; and a sampling algorithm. In some embodiments, the sampling criteria describing the packets of data comprise at least one of the group consisting of: destination addresses of the packets of data; source addresses of the packets of data; identifiers of switch interfaces of the data link layer switch receiving the packets of data into the data link layer switch; identifiers of switch interfaces of the data link layer switch transmitting the packets of data from the data link layer switch; data rates of the packets of data; quantities of data in the packets of data; identifiers of other network devices in the paths of the packets of data; and times of occurrence of the packets of data. In some embodiments, the memory stores a table of data flows describing traffic patterns of the packets of data; wherein the processor modifies the table of data flows based on characteristics of the selected ones of the packets of data; and wherein the processor determines whether the attack upon the data link layer switch has occurred based on the contents of the table of data flows. In some embodiments, the table of data flows comprises at least one of the group consisting of: destination addresses of packets in the data flows; source addresses of packets in the data flows; identifiers of switch interfaces of the data link layer switch receiving the data flows into the data link layer switch; identifiers of switch interfaces of the data link layer switch transmitting the data flows from the data link layer switch; data rates of the data flows; quantities of data in the data flows; identifiers of other network devices involved in the data flows; and times of occurrence of the data flows. In some embodiments, the data link layer switch comprises a plurality of switch interfaces; wherein the table of data flows comprises a plurality of forwarding entries each comprising an Internet Protocol (IP) address and an identifier of the one of the switch interfaces from which packets having the IP address as a destination address should be transmitted; and wherein the processor determines that an attack upon the data link layer switch has occurred when none of the forwarding entries comprises both (1) the IP source address of one of the packets, and (2) an identifier of the one of the switch interfaces on which the one of the packets was received.

In general, in one aspect, the invention features a data link layer switch comprising: means for processing; port means for exchanging packets of data with a network; memory means for storing a switch table; and packet processor means for transferring the packets of data between the port means according to the switch table, the packet processor means comprising classifier means for sending copies of selected ones of the packets of data to the processor means; wherein the processor means determines whether an attack upon the data link layer switch has occurred based on the copies of the selected ones of the packets.

Some embodiments comprise means for manifesting an indication of the attack when the processor means determines that the attack upon the data link layer switch has occurred. Some embodiments comprise means or blocking the packets of data that are related to an attack when the processor means determines that the attack upon the data link layer switch has occurred. In some embodiments, the classifier means identifies the selected ones of the packets of data according to at least one of the group consisting of: contents of the packets of data; sampling criteria describing the packets of data; and a sampling algorithm. In some embodiments, the sampling criteria describing the packets of data comprise at least one of the group consisting of: destination addresses of the packets of data; source addresses of the packets of data; identifiers of switch interfaces of the data link layer switch receiving the packets of data into the data link layer switch; identifiers of switch interfaces of the data link layer switch transmitting the packets of data from the data link layer switch; data rates of the packets of data; quantities of data in the packets of data; identifiers of other network devices in the paths of the packets of data; and times of occurrence of the packets of data.

In some embodiments, the memory means stores a table of data flows describing traffic patterns of the packets of data; wherein the processor means modifies the table of data flows based on characteristics of the selected ones of the packets of data; and wherein the processor means determines whether the attack upon the data link layer switch has occurred based on the contents of the table of data flows. In some embodiments, the table of data flows comprises at least one of the group consisting of: destination addresses of packets in the data flows; source addresses of packets in the data flows; identifiers of switch interfaces of the data link layer switch receiving the data flows into the data link layer switch; identifiers of switch interfaces of the data link layer switch transmitting the data flows from the data link layer switch; data rates of the data flows; quantities of data in the data flows; identifiers of other network devices involved in the data flows; and times of occurrence of the data flows. In some embodiments, the data link layer switch comprises a plurality of switch interface means each associated with one or more of the port means; wherein the table of data flows comprises a plurality of forwarding entries each comprising an Internet Protocol (IP) address and an identifier of the one of the switch interface means from which packets having the IP address as a destination address should be transmitted; and wherein the processor means determines that an attack upon the data link layer switch has occurred when none of the forwarding entries comprises the IP source address of one of the packets and an identifier of the one of the switch interface means on which the one of the packets was received.

In general, in one aspect, the invention features a method for a data link layer switch comprising a processor, the method comprising: exchanging packets of data with a network; storing a switch table; and transferring the packets of data between ports of the data link layer switch according to the switch table; sending copies of selected ones of the packets of data to the processor; wherein the processor determines whether an attack upon the data link layer switch has occurred based on the copies of the selected ones of the packets.

Some embodiments comprise, upon determining that an attack upon the data link layer switch has occurred, performing at least one of the group consisting of: manifesting an indication of the attack; and causing the packets of data that are related to the attack to be blocked. Some embodiments comprise identifying the selected ones of the packets of data according to at least one of the group consisting of contents of the packets of data; sampling criteria describing the packets of data; and a sampling algorithm. In some embodiments, the sampling criteria describing the packets of data comprise at least one of the group consisting of: destination addresses of the packets of data; source addresses of the packets of data; identifiers of switch interfaces of the data link layer switch receiving the packets of data into the data link layer switch; identifiers of switch interfaces of the data link layer switch transmitting the packets of data from the data link layer switch; data rates of the packets of data; quantities of data in the packets of data; identifiers of other network devices in the paths of the packets of data; and times of occurrence of the packets of data. Some embodiments comprise storing a table of data flows describing traffic patterns of the packets of data; modifying the table of data flows based on characteristics of the selected ones of the packets of data; and determining whether the attack upon the data link layer switch has occurred based on the contents of the table of data flows. In some embodiments, the table of data flows comprises at least one of the group consisting of: destination addresses of packets in the data flows; source addresses of packets in the data flows; identifiers of switch interfaces of the data link layer switch receiving the data flows into the data link layer switch; identifiers of switch interfaces of the data link layer switch transmitting the data flows from the data link layer switch; data rates of the data flows; quantities of data in the data flows; identifiers of other network devices involved in the data flows; and times of occurrence of the data flows. In some embodiments, the data link layer switch comprises a plurality of switch interfaces, further comprising storing in the table of data flows a plurality of forwarding entries each comprising an Internet Protocol (IP) address and an identifier of the one of the switch interfaces from which packets having the IP address as a destination address should be transmitted; and determining that an attack upon the data link layer switch has occurred when none of the forwarding entries comprises the IP source address of one of the packets and an identifier of the one of the switch interfaces on which the one of the packets was received.

In general, in one aspect, the invention features a computer program for a data link layer switch that exchanges packets of data with a network, the computer program comprising examining copies of selected ones of the packets of data; and determining whether an attack upon the data link layer switch has occurred based on the copies of the selected ones of the packets.

Some embodiments comprise, upon determining that an attack upon the data link layer switch has occurred, performing at least one of the group consisting of manifesting an indication of the attack; and causing the packets of data that are related to the attack to be blocked. Some embodiments comprise identifying the selected ones of the packets of data according to at least one of the group consisting of contents of the packets of data; sampling criteria describing the packets of data; and a sampling algorithm. In some embodiments, the sampling criteria describing the packets of data comprise at least one of the group consisting of destination addresses of the packets of data; source addresses of the packets of data; identifiers of switch interfaces of the data link layer switch receiving the packets of data into the data link layer switch; identifiers of switch interfaces of the data link layer switch transmitting the packets of data from the data link layer switch; data rates of the packets of data; quantities of data in the packets of data; identifiers of other network devices in the paths of the packets of data; and times of occurrence of the packets of data. Some embodiments comprise storing a table of data flows describing traffic patterns of the packets of data; modifying the table of data flows based on characteristics of the selected ones of the packets of data; and determining whether the attack upon the data link layer switch has occurred based on the contents of the table of data flows. In some embodiments, the table of data flows comprises at least one of the group consisting of destination addresses of packets in the data flows; source addresses of packets in the data flows; identifiers of switch interfaces of the data link layer switch receiving the data flows into the data link layer switch; identifiers of switch interfaces of the data link layer switch transmitting the data flows from the data link layer switch; data rates of the data flows; quantities of data in the data flows; identifiers of other network devices involved in the data flows; and times of occurrence of the data flows. In some embodiments, the data link layer switch comprises a plurality of switch interfaces, and the computer program further comprises storing in the table of data flows a plurality of forwarding entries each comprising an Internet Protocol (IP) address and an identifier of the one of the switch interfaces from which packets having the IP address as a destination address should be transmitted; and determining that an attack upon the data link layer switch has occurred when none of the forwarding entries comprises the IP source address of one of the packets and an identifier of the one of the switch interfaces on which the one of the packets was received.

The details of one or more implementations are set forth in the accompanying drawings and the description below. Other features will be apparent from the description and drawings, and from the claims.

DETAILED DESCRIPTION

Embodiments of the present invention provide data link layer switches with protection against Internet Protocol (IP) spoofing attacks. Data link layer switches according to preferred embodiments of the present invention collect data describing the data flows traversing the switch to establish characteristic traffic patterns for the switch. When subsequent data flows vary significantly from these characteristic traffic patterns, an attack upon the switch is declared.

Preferably the data link layer switch operates in two phases. First, in an initialization phase, the switch learns the traffic patterns by examining the data flows comprising the traffic and populating a data flow table based on this examination, as described below. Thereafter, the switch operates in a protection phase, in which the switch compares the patterns of the data flows in the switch traffic to the patterns in the data flow table to determine whether an attack upon the switch has occurred. Further, the switch can continue to learn traffic patterns during the protection phase.

Figure 1:
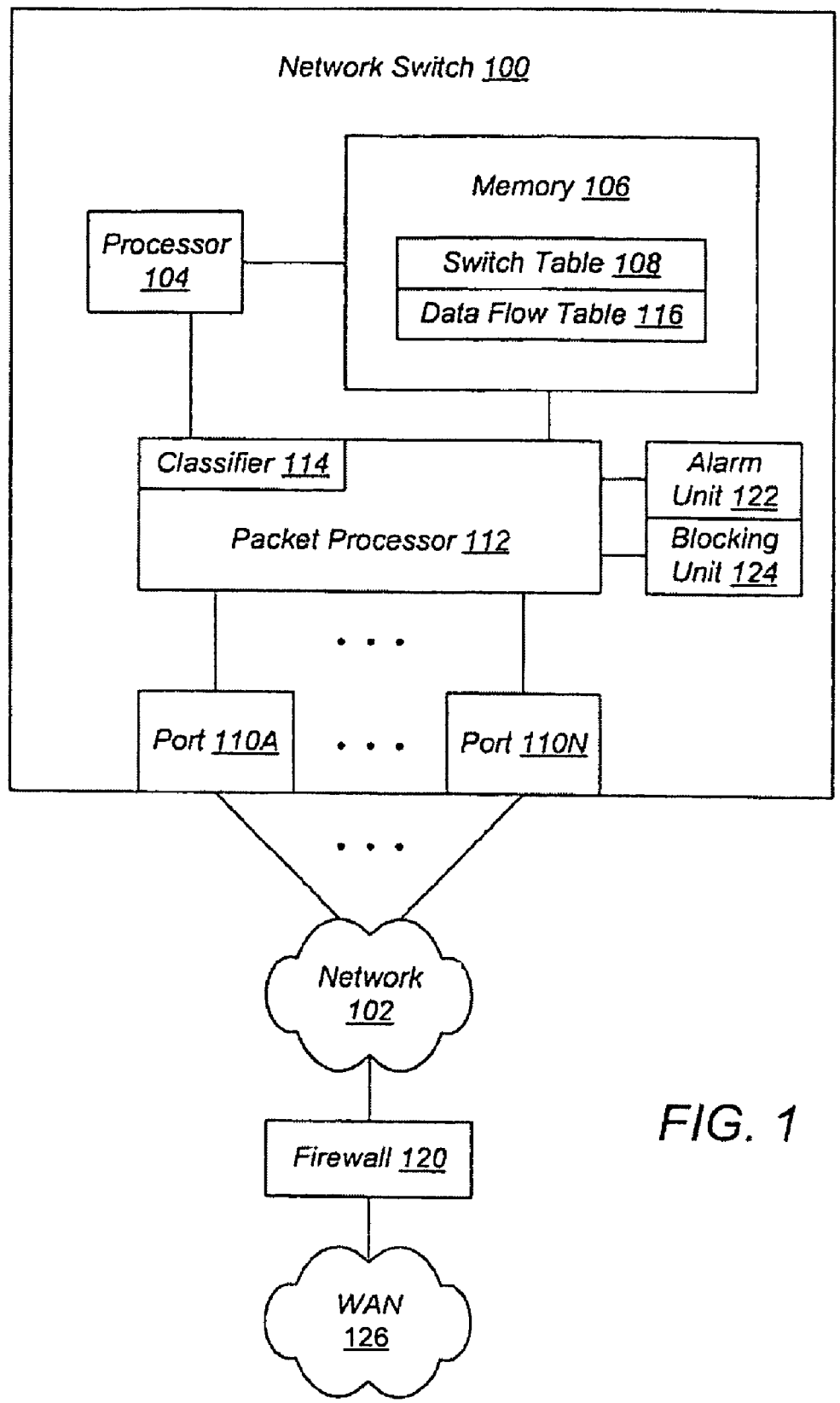
FIG. 1 shows a data link layer switch in communication with a network according to a preferred embodiment of the present invention.

FIG. 1 shows a data link layer switch 100 in communication with a network 102 according to a preferred embodiment of the present invention. A data link layer switch is a network switch that forwards traffic at the data link layer (that is, layer 2 of the Open Systems Interconnection (OSI) Reference Model), but does not route traffic at the network layer (that is, layer 3 of the OSI Reference Model), as is well known in the relevant arts. Network 102 can be a local-area network such as a corporate intranet or the like, and is generally protected from attackers on a wide-area network 126 such as the Internet by a firewall 120, although this is not required.

Switch 100 comprises a processor 104, a memory 106 to store a switch table 108, a plurality of ports 110A-N to exchange packets of data with network 102, and a packet processor 112 to transfer the packets of data between ports 110 according to switch table 108. Packet processor 112 comprises a classifier 114 to determine properties of the packets, and to direct the packets accordingly. In some embodiments, switch 100 additionally comprises an alarm unit 122 and a blocking unit 124.

Data link layer switch 100 can be fabricated as one or more semiconductors. Memory 106 can be fabricated as part of one or more of the semiconductors.

Figure 2:
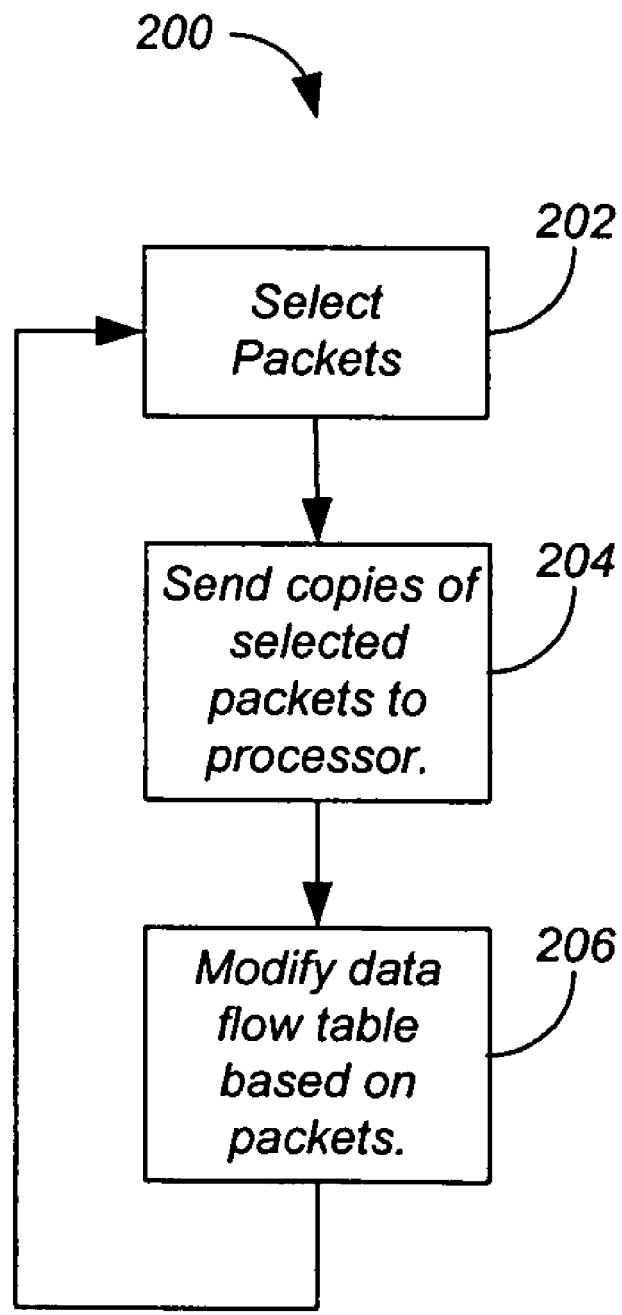
FIG. 2 shows an initialization process for the data link layer switch of FIG. 1 for learning traffic patterns in the data flows traversing the switch according to a preferred embodiment of the present invention.

FIG. 2 shows an initialization process 200 for data link layer switch 100 for learning traffic patterns in the data flows traversing switch 100 according to a preferred embodiment of the present invention. Classifier 114 selects some or all of the packets of data that traverse switch 100 (step 202), and sends a copy of each of the selected packets to processor 104 (step 204). Because network traffic patterns generally do not change rapidly, a small sample of the packets is sufficient to produce accurate characteristic network traffic patterns.

In some embodiments, classifier 114 selects the packets based on data contained in the packet, for example in the packet header. In some embodiments, classifier 114 selects the packets based on sampling criteria describing the packets. For example, packets can be selected based on destination addresses of the packets, source addresses of the packets, identifiers of switch interfaces of the data link layer switch 100 receiving the packets into the data link layer switch 100, identifiers of switch interfaces of the data link layer switch 100 transmitting the packets from the data link layer switch 100, data rates of the packets, quantities of data in the packets, identifiers of other network devices in the paths of the packets, times of occurrence of the packets, or the like, or any combination thereof. The packets can also be selected using a sampling algorithm such as a statistical sampling algorithm. However, embodiments of the present invention are independent of the manner of selection of the packets.

Memory 106 preferably stores a data flow table 116 that describes traffic patterns of the packets of data, preferably according to the data flows comprising the packets. In some embodiments the data flows can be defined by specifying a value or range of values for all or part of one or more fields in each packet in the data flow. For example, these fields can represent the media access control (MAC) or Internet protocol (IP) source address of the packet, the transport control protocol (TCP) or user datagram protocol (UDP) destination port of the packet, the protocol type of the packet, and so on. In some embodiments each data flow is defined as an ordered set of packets transmitted from one network device to another. Some embodiments define other types of data flows. However, embodiments of the present invention are independent of the manner in which data flows are defined.

Processor 104 modifies data flow table 116 based on characteristics of the selected ones of the packets of data (step 206). Data flow table 116 can include destination addresses of packets in the data flows, source addresses of packets in the data flows, identifiers of switch interfaces of the data link layer switch 100 receiving the data flows into the data link layer switch 100, identifiers of switch interfaces of the data link layer switch 100 transmitting the data flows from the data link layer switch 100, data rates of the data flows, quantities of data in the data flows, identifiers of other network devices involved in the data flows, times of occurrence of the data flows, and the like. However, embodiments of the present invention are independent of the particular packet characteristics used to modify data flow table 116.

Process 200 then resumes at step 202, and repeats until the initialization phase is complete.

Figure 3:
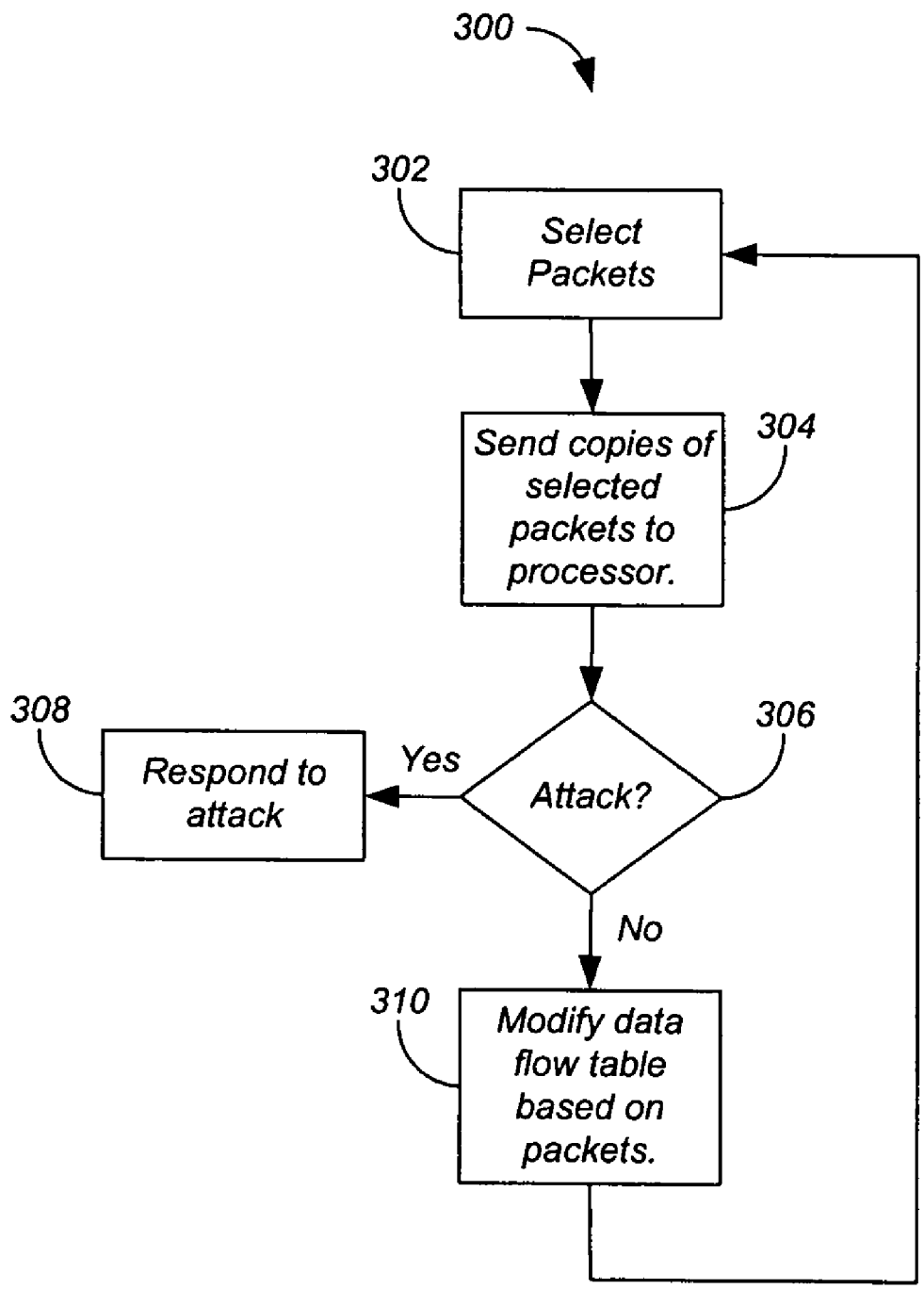
FIG. 3 shows a protection process for the data link layer switch of FIG. 1 for detecting and handling an IP spoofing attack according to a preferred embodiment of the present invention The leading digit(s) of each reference numeral used in this specification indicates the number of the drawing in which the reference numeral first appears.

FIG. 3 shows a protection process 300 for data link layer switch 100 for detecting and handling an IP spoofing attack according to a preferred embodiment of the present invention. Classifier 114 selects some or all of the packets of data that traverse switch 100 (step 302), for example as described above for process 200 of FIG. 2. Classifier 114 sends a copy of each of the selected packets to processor 104 (step 304). Because classifier 114 preferably selects only those packets that belong to new data flows, only a small portion of the packets of data that traverse switch 100 are selected, copied and sent to processor 104. Therefore processor 104 is not unduly burdened. In addition, classifier 114 examines the original packets (not copies) in silicon. Therefore no copies are made for most packets.

Processor 104 determines whether an attack upon switch 100 has occurred (step 306) based on the copies of the packets. Preferably processor 104 determines whether an attack has occurred by comparing the patterns of the data flows comprising the selected packets to the patterns in data flow table 116. For example, if data flow table 116 shows that a particular computer normally generates traffic only during regular business hours, but the selected packets show significant traffic with that computer late at night, an attack could have occurred. As a further example, if data flow table 116 shows that a particular computer normally generates a small amount of traffic, but the selected packets show a large amount of traffic with that computer, an attack could have occurred. Of course, these are only examples. Any sort of criteria can be used to establish patterns and detect attacks based on those patterns.

Preferably switch 100 continues to learn traffic patterns during the protection phase. Therefore, if in step 306 no attack has occurred, processor 104 modifies data flow table 116 based on characteristics of the selected packets of data (step 310), for example as described above for process 200 of FIG. 2. Process 300 then resumes at step 302.

But if at step 306 processor 104 detects an attack, processor 104 responds (step 308). In some embodiments, alarm unit 122 manifests an indication of the attack, for example by sending a message to a system administrator. In some embodiments, blocking unit 124 disrupts the data flow of the attack, for example by causing the packets of data that are related to the attack to be blocked. Of course, processor 104 can employ other responses to the attack. However, embodiments of the present invention are independent of the type of response.

In some embodiments, switch 100 compares the path of a data flow to its reverse path. Switch 100 comprises a plurality of switch interfaces each associated with one or more of ports 110, as is well-known in the relevant arts. Switch 100 determines whether the switch interface that receives a packet from a network device is the same switch interface that would be used to send a packet to that network device. If not, then it is likely that the network device is conducting an IP spoofing attack. This technique for detecting attacks can be used alone or in combination with the techniques described above.

According to these embodiments, data flow table 116 stores forwarding entries each comprising an Internet Protocol (IP) address and an identifier of the switch interface from which packets having the IP address as a destination address should be transmitted. When none of the forwarding entries comprises the IP source address of a packet and an identifier of the one of the switch interfaces on which that packet was received, processor 104 determines that an attack upon data link layer switch 100 has occurred.

A number of implementations of the invention have been described. Nevertheless, it will be understood that various modifications may be made without departing from the spirit and scope of the invention. Accordingly, other implementations are within the scope of the following claims.

What is claimed is:

1. A data link layer switch comprising:
a first processor;
a plurality of ports configured to exchange M packets of data with a network, where M is an integer;
a memory configured to store a switch table; and
a packet processor that is distinct from the first processor, wherein the packet processor is configured to transfer the M packets of data between the ports according to the switch table, and wherein the packet processor comprises a classifier configured to (i) select N of the M packets of data according to sampling criteria describing the M packets of data without discarding a packet of the M packets and (ii) send N copies of the N selected ones of the M packets of data to the first processor, where N is an integer less than M,
wherein the first processor is configured to determine whether an attack upon the data link layer switch has occurred based on the N copies,
wherein the classifier is configured to send the N copies to the first processor prior to the data link layer switch determining whether the M packets of data are associated with an attack,
wherein the classifier is configured to (i) select the N copies as a representative group of the M packets of data and (ii) transfer the N copies to the first processor prior to threat assessment of the M packets of data by the first processor,
wherein the first processor is configured to determine whether the M packets of data are associated with an attack based on the N copies, and
wherein the sampling criteria describing the M packets of data comprise at least one of
destination addresses of the M packets of data,
source addresses of the M packets of data,
identifiers of switch interfaces of the data link layer switch receiving the M packets of data into the data link layer switch,
identifiers of switch interfaces of the data link layer switch transmitting the M packets of data from the data link layer switch,
data rates of the M packets of data,
quantities of data in the M packets of data,
identifiers of other network devices in paths of the M packets of data, or
times of occurrence of the M packets of data
wherein the classifier, when selecting the N of the M packets of data, selects only packets that belong to new data flows based on a table of data flows.

2. The data link layer switch of claim 1, further comprising an alarm unit configured to manifest an indication of an attack in response to the first processor determining an attack upon the data link layer switch has occurred.

3. The data link layer switch of claim 1, further comprising a blocking unit configured to block packets of the M packets of data related to an attack in response to the first processor determining an attack upon the data link layer switch has occurred.

4. The data link layer switch of claim 1, wherein the classifier is configured to identify the N selected ones of the M packets of data according to at least one of:
contents of the M packets of data; or
a sampling algorithm.

5. The data link layer switch of claim 4, wherein:
the sampling criteria describing the M packets of data comprise data rates of the M packets of data, quantities of data in the M packets of data, and transmit times of the M packets of data; and
the first processor is configured to determine whether an attack upon the data link layer switch has occurred based on the data rates, the quantities of data, and the transmit times.

6. The data link layer switch of claim 4, wherein:
the sampling criteria describing the packets of data comprise (i) a first identifier of a first switch interface of the data link layer switch that receives the M packets of data and (ii) a second identifier of a second switch interface of the data link layer switch that transmits the M packets of data; and
the first processor is configured to determine whether an attack upon the data link layer switch has occurred based on the first identifier matching the second identifier.

7. The data link layer switch of claim 1, wherein the sampling criteria describing the M packets of data comprise:
the destination addresses of the M packets of data;
the source addresses of the M packets of data;

the identifiers of the switch interfaces of the data link layer switch receiving the M packets of data into the data link layer switch;
the identifiers of the switch interfaces of the data link layer switch transmitting the M packets of data from the data link layer switch;
the data rates of the M packets of data;
the quantities of data in the M packets of data;
the identifiers of the other network devices in the paths of the M packets of data; and
the times of occurrence of the M packets of data.

8. The data link layer switch of claim 1, wherein:
the memory is configured to store the table of data flows describing traffic patterns of the M packets of data;
the first processor is configured to modify the table of data flows based on characteristics of the N selected ones of the M packets of data; and
the first processor is configured to determine whether an attack upon the data link layer switch has occurred based on contents of the table of data flows.

9. The data link layer switch of claim 8, wherein the table of data flows comprises at least one of:
destination addresses of packets in the data flows;
source addresses of packets in the data flows;
identifiers of switch interfaces of the data link layer switch receiving the data flows into the data link layer switch;
identifiers of switch interfaces of the data link layer switch transmitting the data flows from the data link layer switch;
data rates of the data flows; or
quantities of data in the data flows;
identifiers of other network devices involved in the data flows; or
time of occurrence of the data flows.

10. The data link layer switch of claim 8, wherein the data link layer switch comprises a plurality of switch interfaces,
wherein the table of data flows comprises a plurality of forwarding entries, each of the forwarding entries comprising (i) an Internet Protocol (IP) address and (ii) an identifier of the one of the switch interfaces from which packets having the IP address as a destination address should be transmitted, and
wherein the first processor is configured to determine that an attack upon the data link layer switch has occurred when none of the forwarding entries comprises:
the IP source address of one of the N selected ones of the M packets of data; and
an identifier of the one of the switch interfaces on which the one of the N selected ones of the M packets of data was received.

11. The data link layer switch of claim 8, wherein:
the table of data flows comprises data rates of the M packets of data, quantities of data in the M packets of data, and transmit times of the M packets of data; and
the first processor is configured to determine whether an attack upon the data link layer switch has occurred based on the data rates, the quantities of data, and the transmit times.

12. The data link layer switch of claim 8, wherein:
the table of data flows comprises (i) a first identifier of a first switch interface of the data link layer switch that receives the M packets of data and (ii) a second identifier of a switch interface of the data link layer switch that transmits the M packets of data; and
the first processor is configured to determine whether an attack upon the data link layer switch has occurred based on the first identifier matching the second identifier.

13. The data link layer switch of claim 1, wherein the classifier is configured to select N packets of the M packets of data, copies the selected N packets to generate the N copies, and sends the N copies to the first processor.

14. The data link layer switch of claim 1, wherein:
the switch table includes packet patterns comprising at least one of (i) a time of use pattern or (ii) an amount of use pattern; and
the first processor is configured to determine whether an attack upon the data link layer switch has occurred based on the packet patterns and at least one of (i) a time of use associated with the N copies or (ii) an amount of traffic associated with the N copies.

15. The data link layer switch of claim 14, wherein the time of use pattern includes stored times when a network device generates packet traffic in the data link layer switch, the network device is at least one of (i) transmitting or (ii) receiving the M packets of data, and
wherein the first processor is configured to:
perform a comparison between a current time associated with the sending of the M packets of data and the stored times; and
determine whether an attack upon the data link switch has occurred based on the comparison.

16. The data link layer switch of claim 14, wherein the amount of use pattern includes stored traffic values and corresponding times when a network device generates packet traffic in the data link layer switch, the network device at least one of (i) transmits or (ii) receives the M packets of data,
wherein each of the stored traffic values corresponds to packet traffic generated by the network device for a respective period, and
wherein the first processor is configured to:
perform a comparison between a current traffic value and a current time associated with the sending of the M packets of data and the stored traffic values and times; and
determine whether an attack upon the data link switch has occurred based on the comparison.

17. The data link layer switch of claim 1, further comprising switch interfaces, wherein:
the first processor is configured to detect Internet protocol spoofing by determining whether one of the switch interfaces receiving packets transmitted from a network device is a same switch interface used to send a packet to the network device; and
the first processor is configured to determine whether an attack upon the data link layer switch has occurred based on the detection of Internet protocol spoofing.

18. The data link layer switch of claim 1, wherein the classifier is configured to send the N copies to the first processor independent of whether the N copies are associated with an attack.

19. The data link layer switch of claim 1, wherein the classifier is configured to select the N copies independent of whether the N copies are associated with an attack.

20. The data link layer switch of claim 1, wherein the classifier is configured to send the N copies to the first processor independent of threat assessment of the M packets of data.

21. The data link layer switch of claim 1, wherein the first processor does not determine whether the M packets of data are associated with an attack prior to the classifier sending the N copies to the first processor.

22. The data link layer switch of claim 1, wherein the classifier is configured to select the N copies independent of threat assessment of the M packets of data.

23. The data link layer switch of claim 1, wherein:
the memory is configured to store a table of data flows describing traffic patterns of the M packets of data;
the processor is configured to modify the table of data flows based on characteristics of the N selected ones of the M packets of data;
the processor is configured to determine whether an attack upon the data link layer switch has occurred based on contents of the table of data flows; and
the table of data flows comprises:
destination addresses of packets in the data flows;
source addresses of packets in the data flows;
identifiers of switch interfaces of the data link layer switch receiving the data flows into the data link layer switch;
identifiers of switch interfaces of the data link layer switch transmitting the data flows from the data link layer switch;
data rates of the data flows;
quantities of data in the data flows;
identifiers of other network devices involved in the data flows; and
time of occurrence of the data flows.

24. The data link layer switch of claim 1, wherein the table of data flows comprises at least one of:
destination addresses of packets in the data flows;
source addresses of packets in the data flows;
identifiers of switch interfaces of the data link layer switch receiving the data flows into the data link layer switch;
identifiers of switch interfaces of the data link layer switch transmitting the data flows from the data link layer switch;
data rates of the data flows;
quantities of data in the data flows;
identifiers of other network devices involved in the data flows; or
time of occurrence of the data flows.

25. The data link layer switch of claim 1, wherein the table of data flows comprises:
destination addresses of packets in the data flows;
source addresses of packets in the data flows;
identifiers of switch interfaces of the data link layer switch receiving the data flows into the data link layer switch;
identifiers of switch interfaces of the data link layer switch transmitting the data flows from the data link layer switch;
data rates of the data flows;
quantities of data in the data flows;
identifiers of other network devices involved in the data flows; and
time of occurrence of the data flows.

26. The data link layer switch of claim 1, wherein the classifier (i) does not copy M-N of the M packets, (ii) does not forward the M-N of the M packets to the first processor, and (iii) examines the M-N of the M packets.

27. The data link layer switch of claim 1, wherein the packet processor transfers the M packets of data between the ports according to the switch table.

28. A data link layer switch comprising:
means for processing;
port means for exchanging M packets of data with a network, where M is an integer;
memory means for storing a switch table; and
packet processor means for transferring the M packets of data between the port means according to the switch table, wherein the packet processor means comprises classifier means for (i) selecting N of the M packets of data according to sampling criteria describing the M packets of data without discarding a packet of the M packets and (ii) sending N copies of the N selected ones of the M packets of data to the means for processing, where N is an integer less than M,
wherein the means for processing determines whether an attack upon the data link layer switch has occurred based on the N copies,
wherein the means for processing is distinct from the packet processor means, and
wherein the classifier means sends the N copies to the means for processing prior to the data link layer switch determining whether the M packets of data are associated with an attack,
wherein the classifier means (i) selects the N copies as a representative group of the M packets of data and (ii) transfers the N copies to the means for processing prior to threat assessment of the M packets of data by the means for processing,
wherein the means for processing determines whether the M packets of data are associated with an attack based on the N copies, and
wherein the sampling criteria describing the M packets of data comprise at least one of
destination addresses of the M packets of data,
source addresses of the M packets of data,
identifiers of switch interfaces of the data link layer switch receiving the M packets of data into the data link layer switch,
identifiers of switch interfaces of the data link layer switch transmitting the M packets of data from the data link layer switch,
data rates of the M packets of data,
quantities of data in the M packets of data,
identifiers of other network devices in paths of the M packets of data, or
times of occurrence of the M packets of data
wherein the classifier means, when selecting the N of the M packets of data, selects only packets that belong to new data flows based on a table of data flows.

29. The data link layer switch of claim 28, further comprising means for manifesting an indication of an attack in response to the means for processing determining an attack upon the data link layer switch has occurred.

30. The data link layer switch of claim 28, further comprising means for blocking packets of the M packets of data related to an attack in response to the means for processing determining an attack upon the data link layer switch has occurred.

31. The data link layer switch of claim 28, wherein the classifier means identifies the N selected ones of the M packets of data according to at least one of:
contents of the M packets of data; or
a sampling algorithm.

32. The data link layer switch of claim 31, wherein the sampling criteria describing the M packets of data comprise:
the destination addresses of the M packets of data;
the source addresses of the M packets of data;
the identifiers of the switch interfaces of the data link layer switch receiving the M packets of data into the data link layer switch;
the identifiers of the switch interfaces of the data link layer switch transmitting the M packets of data from the data link layer switch;
the data rates of the M packets of data;
the quantities of data in the M packets of data;

the identifiers of the other network devices in the paths of the M packets of data; and the times of occurrence of the M packets of data.

33. The data link layer switch of claim 28, wherein:

the memory means stores the table of data flows describing traffic patterns of the M packets of data;

the means for processing modifies the table of data flows based on characteristics of the N selected ones of the M packets of data; and the means for processing determines whether an attack upon the data link layer switch has occurred based on contents of the table of data flows.

34. The data link layer switch of claim 33, wherein the table of data flows comprises at least one of:

destination addresses of packets in the data flows;

source addresses of packets in the data flows;

identifiers of switch interfaces of the data link layer switch receiving the data flows into the data link layer switch;

identifiers of switch interfaces of the data link layer switch transmitting the data flows from the data link layer switch;

data rates of the data flows;

quantities of data in the data flows;

identifiers of other network devices involved in the data flows; or times of occurrence of the data flows.

35. The data link layer switch of claim 33, wherein:

the data link layer switch comprises a plurality of switch interface means;

each of the plurality of switch interface means is associated with one or more of the port means;

the table of data flows comprises a plurality of forwarding entries;

each of the forwarding entries comprises (i) an Internet Protocol (IP) address and (ii) an identifier of the one of the switch interface means from which packets having the IP address as a destination address should be transmitted; and the means for processing determines that an attack upon the data link layer switch has occurred when none of the forwarding entries comprises the IP source address of one of the N selected ones of the M packets of data, and an identifier of the one of the switch interface means on which the one of the N selected ones of the M packets of data was received.

36. A method for a data link layer switch comprising a processor, the method comprising:

exchanging M packets of data with a network, where M is an integer;

storing a switch table;

transferring the M packets of data between ports of the data link layer switch according to the switch table;

selecting N of the M packets of data according to sampling criteria describing the M packets of data without discarding a packet of the M packets;

selecting N copies of the N selected ones of the M packets of data as a representative group of the M packets of data;

sending the N copies to the processor prior to the data link layer switch determining whether the M packets of data are associated with an attack, where N is an integer less than M; and determining via the processor whether an attack upon the data link layer switch has occurred including determining whether the M packets of data are associated with an attack based on the N copies, wherein the N copies are transferred to the processor prior to threat assessment of the M packets of data by the processor, and wherein the sampling criteria describing the M packets of data comprise at least one of destination addresses of the M packets of data, source addresses of the M packets of data, identifiers of switch interfaces of the data link layer switch receiving the M packets of data into the data link layer switch, identifiers of switch interfaces of the data link layer switch transmitting the M packets of data from the data link layer switch, data rates of the M packets of data, quantities of data in the M packets of data, identifiers of other network devices in paths of the M packets of data, or times of occurrence of the M packets of data when selecting the N of the M packets of data, selecting only packets that belong to new data flows based on a table of data flows.

37. The method of claim 36, further comprising, upon determining that an attack upon the data link layer switch has occurred, performing at least one of:

manifesting an indication of an attack; or causing packets of data related to an attack to be blocked.

38. The method of claim 36, further comprising identifying the N selected ones of the M packets of data according to at least one of:

contents of the M packets of data; or a sampling algorithm.

39. The method of claim 38, wherein the sampling criteria describing the M packets of data comprise:

destination addresses of the M packets of data;

source addresses of the M packets of data;

identifiers of switch interfaces of the data link layer switch receiving the M packets of data into the data link layer switch;

identifiers of switch interfaces of the data link layer switch transmitting the M packets of data from the data link layer switch;

data rates of the M packets of data;

quantities of data in the M packets of data;

identifiers of other network devices in the paths of the M packets of data; and times of occurrence of the M packets of data.

40. The method of claim 36, further comprising:

storing the table of data flows describing traffic patterns of the M packets of data;

modifying the table of data flows based on characteristics of the N selected ones of the M packets of data; and determining whether an attack up on the data link layer switch has occurred based on contents of the table of data flows.

41. The method of claim 40, wherein the table of data flows comprises at least one of:

destination addresses of packets in the data flows;

source addresses of packets in the data flows;

identifiers of switch interfaces of the data link layer switch receiving the data flows into the data link layer switch;

identifiers of switch interfaces of the data link layer switch transmitting the data flows from the data link layer switch;

data rates of the data flows;

quantities of data in the data flows;

identifiers of other network devices involved in the data flows; or times of occurrence of the data flows.

42. The method of claim 40, wherein the data link layer switch comprises a plurality of switch interfaces, and wherein the method further comprises:
- storing in the table of data flows a plurality of forwarding entries, each of the forwarding entries comprising (i) an Internet Protocol (IP) address and (ii) an identifier of the one of the switch interfaces from which packets having the IP address as a destination address should be transmitted; and
- determining that an attack upon the data link layer switch has occurred when none of the forwarding entries comprises
  - the IP source address of one of the N selected ones of the M packets of data, and
  - an identifier of the one of the switch interfaces on which the one of the N selected ones of the M packets of data was received.

43. Memory that stores a program for a data link layer switch, the data link layer switch exchanging M packets of data with a network, where M is an integer, the program comprising instructions for:
- selecting N of the M packets of data according to sampling criteria describing the M packets of data without discarding a packet of the M packets;
- selecting N copies of the N selected ones of the M packets of data as a representative group of the M packets of data;
- sending the N copies to a processor prior to the data link layer switch determining whether the M packets of data are associated with an attack, where N is an integer less than M;
- examining the N copies; and
- determining via the processor whether an attack upon the data link layer switch has occurred including determining whether the M packets of data are associated with an attack based on the N copies,
- wherein the N copies are transferred to the processor prior to threat assessment of the M packets of data by the processor, and
- wherein the sampling criteria describing the M packets of data comprise
  - destination addresses of the M packets of data,
  - source addresses of the M packets of data,
  - identifiers of switch interfaces of the data link layer switch receiving the M packets of data into the data link layer switch,
  - identifiers of switch interfaces of the data link layer switch transmitting the M packets of data from the data link layer switch,
  - data rates of the M packets of data,
  - quantities of data in the M packets of data,
  - identifiers of other network devices in paths of the M packets of data, and
  - times of occurrence of the M packets of data
  - when selecting the N of the M packets of data, selecting only packets that belong to new data flows based on a table of data flows.

44. The memory of claim 43, wherein the program further comprises an instruction for determining that an attack upon the data link layer switch has occurred and at least one of
- manifesting an indication of an attack; or
- causing packets of data related to an attack to be blocked.

45. The memory of claim 43, wherein the program further comprises an instruction for identifying the N selected ones of the M packets of data according to at least one of:
- contents of the M packets of data; or
- a sampling algorithm.

46. The memory of claim 45, wherein the sampling criteria describing the M packets of data comprise:
- destination addresses of the M packets of data;
- source addresses of the M packets of data;
- identifiers of switch interfaces of the data link layer switch receiving the M packets of data into the data link layer switch;
- identifiers of switch interfaces of the data link layer switch transmitting the M packets of data from the data link layer switch;
- data rates of the M packets of data;
- quantities of data in the M packets of data;
- identifiers of other network devices in the paths of the M packets of data; and
- times of occurrence of the M packets of data.

47. The memory of claim 43, wherein the program further comprises instructions for:
- storing the table of data flows describing traffic patterns of the M packets of data;
- modifying the table of data flows based on characteristics of the N selected ones of the M packets of data; and
- determining whether an attack upon the data link layer switch has occurred based on contents of the table of data flows.

48. The memory of claim 47, wherein the table of data flows comprises at least one of
- destination addresses of packets in the data flows;
- source addresses of packets in the data flows;
- identifiers of switch interfaces of the data link layer switch transmitting the data flows from the data link layer switch;
- data rates of the data flows;
- quantities of data in the data flows;
- identifiers of other network devices involved in the data flows; or
- times of occurrence of the data flows.

49. The memory of claim 47, wherein the data link layer switch comprises a plurality of switch interfaces, and wherein the program further comprises instructions for:
- storing in the table of data flows a plurality of forwarding entries, each of the forwarding entries comprising (i) an Internet Protocol (IP) address and (ii) an identifier of the one of the switch interfaces from which packets having the IP address as a destination address should be transmitted; and
- determining that an attack upon the data link layer switch has occurred when none of the forwarding entries comprises
  - the IP source address of one of the N selected ones of the M packets of data, and
  - an identifier of the one of the switch interfaces on which the one of the N selected ones of the M packets of data was received.

* * * * *